United States Patent
Xu et al.

(10) Patent No.: US 10,361,954 B2
(45) Date of Patent: Jul. 23, 2019

(54) METHOD AND APPARATUS FOR PROCESSING MODIFIED PACKET

(71) Applicant: Huawei Technologies Co., Ltd., Shenzhen (CN)

(72) Inventors: Weiping Xu, Shenzhen (CN); Yuanlong Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 15/430,795

(22) Filed: Feb. 13, 2017

(65) Prior Publication Data
US 2017/0155582 A1 Jun. 1, 2017

Related U.S. Application Data (63) Continuation of application No. PCT/CN2015/086801, filed on Aug. 12, 2015.

(30) Foreign Application Priority Data

Aug. 14, 2014 (CN) .......................... 2014 1 0401433

(51) Int. Cl.
*G06F 16/00* (2019.01)
*G06F 16/951* (2019.01)
(Continued)

(52) U.S. Cl.
CPC .............. *H04L 45/74* (2013.01); *G06F 16/00* (2019.01); *G06F 16/951* (2019.01); *H04L 45/20* (2013.01);
(Continued)

(58) Field of Classification Search
CPC ..... H04L 45/123; H04L 45/125; H04L 45/04; H04L 45/50; H04L 12/4641; H04L 45/38; H04L 45/306; H04L 45/745
See application file for complete search history.

(56) References Cited

U.S. PATENT DOCUMENTS

| | | | |
|---|---|---|---|
| 2006/0050653 A1* | 3/2006 | Guichard | ............... H04L 45/02 370/254 |
| 2006/0209682 A1* | 9/2006 | Filsfils | ................... H04L 45/04 370/219 |

(Continued)

FOREIGN PATENT DOCUMENTS

| | | |
|---|---|---|
| CN | 101924701 A | 12/2010 |
| CN | 101938421 A | 1/2011 |

(Continued)

OTHER PUBLICATIONS

Boucadair, M. et al., "Service Function Chaining: Framework & Architecture draft-boucadair-sfc-framework-02," SFC Internet-Draft, Intended Status: Standards Track, Expires: Aug. 16, 2014, XP015096732, Feb. 13, 2014, 25 pages.

(Continued)

*Primary Examiner* — Un C Cho
*Assistant Examiner* — Peter K Mak
(74) *Attorney, Agent, or Firm* — Slater Matsil, LLP (57) ABSTRACT

A method and an apparatus for processing a modified packet. A first routing device obtains a first packet sent by a second routing device, where the first packet carries a first correspondence, creates a forwarding entry that includes the first correspondence, receives a modified packet and determines an ID of a destination service function (SF) of the modified packet, queries the forwarding entry according to the ID of the destination SF, and determines that an SF identified by the ID of the destination SF is an SF connected to a second routing device, and forwards the modified packet to the second routing device.

12 Claims, 4 Drawing Sheets

(51) Int. Cl.
*H04L 29/08* (2006.01)
*H04L 12/741* (2013.01)
*H04L 12/725* (2013.01)
*H04L 12/46* (2006.01)
*H04L 12/717* (2013.01)
*H04L 12/733* (2013.01)
*H04L 29/06* (2006.01)

(52) U.S. Cl.
CPC ............ *H04L 45/306* (2013.01); *H04L 45/54* (2013.01); *H04L 67/327* (2013.01); *H04L 69/22* (2013.01); *H04L 12/4633* (2013.01); *H04L 45/42* (2013.01)

(56) References Cited

U.S. PATENT DOCUMENTS

| | | | |
|---|---|---|---|
| 2010/0165985 A1 | 7/2010 | Sharma et al. | |
| 2010/0284305 A1* | 11/2010 | Papp | H04L 12/4641 370/254 |
| 2011/0069634 A1* | 3/2011 | Hajiaghayi | H04L 45/00 370/254 |
| 2011/0199939 A1 | 8/2011 | Zi et al. | |
| 2017/0019341 A1 | 1/2017 | Huang et al. | |
| 2017/0048148 A1 | 2/2017 | Huang et al. | |

FOREIGN PATENT DOCUMENTS

| | | |
|---|---|---|
| CN | 103905447 A | 7/2014 |
| CN | 103929368 A | 7/2014 |
| CN | 103929492 A | 7/2014 |
| EP | 3116189 A1 | 1/2017 |
| WO | 2010048859 A1 | 5/2010 |

OTHER PUBLICATIONS

Jiang, Y. et al., "An Architecture of Service Function Chaining draft-jiang-sfc-arch-01.txt," Internet Working Group, Internet Draft, Intended Status: Informational, XP015097057, Feb. 14, 2014, 12 pages.

Xu, X. et al., "Service Function Chaining Use Case for Spring draft-xu-spring-sfc-use-case-01," Network Working Group, Internet-Draft, Intended Status: Informational, Expires: Dec. 20, 2014, XP015099652, Jun. 18, 2014, 6 pages.

Xu, X. et al., "Advertising Service Functions Using OSPF draft-xu-ospf-service-function-adv-02," Network Working Group, Internet-Draft, Intended Status: Standards Track, Expires: Dec. 31, 2014, XP015099909, Jun. 30, 2014, 5 pages.

Xu, X. et al., "PCE-based SFC Architecture in SR Networks draft-xu-spring-pce-based-sfc-arch-01," Spring Working Group, Internet-Draft, Intended Status: Standards Track, Expires: Dec. 24, 2014, XP015099735, Jun. 22, 2014, 9 pages.

* cited by examiner

METHOD AND APPARATUS FOR PROCESSING MODIFIED PACKET

CROSS-REFERENCE TO RELATED APPLICATIONS

This application is a continuation of International Application No. PCT/CN2015/086801, filed on Aug. 12, 2015, which claims priority to Chinese Patent Application No. 201410401433.8, filed on Aug. 14, 2014. The disclosures of the aforementioned applications are hereby incorporated by reference in their entireties.

TECHNICAL FIELD

The present invention relates to the communications field, and in particular, to a method and an apparatus for processing a modified packet.

BACKGROUND

Generally, multiple packets (Packet) forwarded in a network belong to one or more service flow types. For example, service flows of different types need to be processed by using different service function (SF) nodes.

Figure 1:
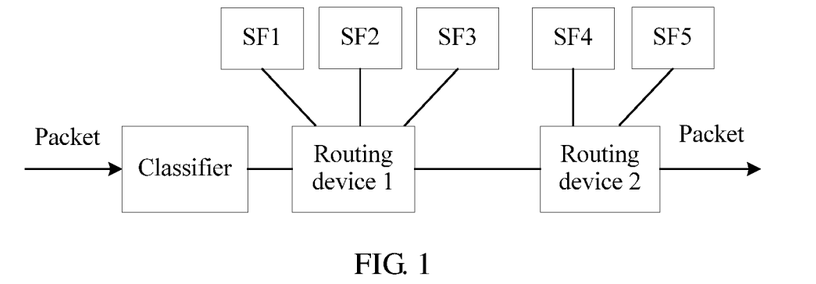
FIG. 1 is a schematic diagram of a network for forwarding a modified packet.

In the prior art, a procedure of processing a service packet is generally: when a network receives a packet sent by a user, a classifier determines, according to a preset classification rule, a service flow type to which the packet belongs, and then selects a proper service chain according to the determined service flow type, to process the packet. FIG. 1 is used as an example. FIG. 1 is a schematic diagram of a network for service packet forwarding. The network shown in FIG. 1 includes a routing device 1, an SF 1, an SF 2, an SF 3, a routing device 2, an SF 4, and an SF 5, where the SF 1, the SF 2, and the SF 3 are connected to the routing device 1, and the SF 4 and the SF 5 are connected to the routing device 2. When a packet reaches a classifier, the classifier determines a service flow type to which the packet belongs. It is assumed that a service flow of this type needs to be processed by using the SF 1 and the SF 4 successively, the classifier determines that a path that the service packet passes through is: the classifier→the routing device 1→the SF 1→the routing device 1→the routing device 2→the SF 4→the routing device 2. The classifier adds a service chain header to the packet, to obtain a modified packet. The service chain header includes a determined-service-chain identifier (ID). The classifier forwards the modified packet, so that the modified packet passes through all nodes on the service chain successively, and processing of the modified packet is completed. To forward the modified packet on a service chain, the routing device 1 and the routing device 2 need to know not only a correspondence between an ID of an SF and a service chain ID, but also an ID of a next-hop SF on the service chain and network address information of a routing device connected to the next-hop SF. That is, each routing device needs to create a forwarding entry. The forwarding entry includes a correspondence between the service chain ID, the ID of the SF, and network address information of a routing device connected to the SF. The forwarding entry is centrally configured and delivered by a controller.

A main function of the controller in the network is monitoring a relationship between each SF and the service chain, but not concerning related information of a routing device. However, to configure a forwarding entry for the routing device, the controller needs to additionally obtain network address information of the routing device. Consequently, the controller needs to additionally consume a network resource when configuring the forwarding entry for the routing device, and extra data processing load is brought to the controller.

SUMMARY

To resolve the foregoing technical problem, embodiments of the present invention provide a method and an apparatus for processing a modified packet, and a controller is no longer required to additionally obtain network address information of a routing device.

According to a first aspect, an embodiment of the present invention provides a method for processing a modified packet, including obtaining, by a first routing device, a first packet sent by a second routing device, where the first packet carries a first correspondence, the first correspondence includes a correspondence between network address information of the second routing device and an ID of an SF connected to the second routing device, and the second routing device is connected to the first routing device. The method further includes creating, by the first routing device, a forwarding entry, where the forwarding entry includes the first correspondence, and the network address information of the second routing device in the forwarding entry indicates address information of a next-hop routing device of the first routing device on a service chain, receiving, by the first routing device, a modified packet, and determining an ID of a destination SF of the modified packet, querying, by the first routing device, the forwarding entry according to the ID of the destination SF, obtaining the network address information of the second routing device from the first correspondence that matches the ID of the destination SF, and determining that an SF identified by the ID of the destination SF is the SF connected to the second routing device, and forwarding, by the first routing device, the modified packet to the second routing device according to the network address information of the second routing device.

In a first possible implementation manner of the first aspect, the method further includes obtaining, by the first routing device, a second correspondence, where the second correspondence is a correspondence between network address information of the first routing device and an ID of an SF connected to the first routing device, and sending, by the first routing device, a second packet to a third routing device connected to the first routing device, where the second packet carries the second correspondence.

With reference to the first aspect or the first possible implementation manner of the first aspect, in a second possible implementation manner, the method further includes sending, by the first routing device, a third packet to the third routing device connected to the first routing device, where the third packet carries the first correspondence, and the third routing device is different from the second routing device.

With reference to the first aspect or the first or the second possible implementation manner of the first aspect, in a third possible implementation manner, the first packet obtained by the first routing device further carries a third correspondence, where the third correspondence includes a correspondence between the network address information of the second routing device and a network type of a network of the second routing device, and the network type includes a UDP network or a GRE network, and the forwarding entry created by the first routing device further includes the third correspondence.

With reference to the third possible implementation manner of the first aspect, in a fourth possible implementation manner, the forwarding, by the first routing device, the modified packet to the second routing device according to the network address information of the second routing device includes forwarding, by the first routing device, the modified packet to the second routing device according to the network address information of the second routing device by using a forwarding tunnel that is corresponding to the network type of the network of the second routing device, where the forwarding tunnel that is corresponding to the network type of the network of the second routing device is determined according to the third correspondence.

According to a second aspect, an embodiment of the present invention provides an apparatus for processing a modified packet, including a receiving unit, configured to obtain a first packet sent by a second routing device, where the first packet carries a first correspondence, the first correspondence includes a correspondence between network address information of the second routing device and an ID of an SF connected to the second routing device, and the second routing device is connected to the apparatus for processing a modified packet, a processing unit, configured to create a forwarding entry, where the forwarding entry includes the first correspondence, and the network address information of the second routing device in the forwarding entry indicates address information of a next-hop routing device, on a service chain, of the apparatus for processing a modified packet, where the receiving unit is further configured to receive a modified packet, and determine an ID of a destination SF of the modified packet, and the processing unit is further configured to: query the forwarding entry according to the ID of the destination SF, obtain the network address information of the second routing device from the first correspondence that matches the ID of the destination SF, and determine that an SF identified by the ID of the destination SF is the SF connected to the second routing device, and a sending unit, configured to forward the modified packet to the second routing device according to the network address information of the second routing device.

In a first possible implementation manner of the second aspect, the receiving unit is further configured to obtain a second correspondence, where the second correspondence is a correspondence between network address information of the apparatus for processing a modified packet and an ID of an SF connected to the apparatus for processing a modified packet, and the sending unit is further configured to send a second packet to a third routing device connected to the apparatus for processing a modified packet, where the second packet carries the second correspondence.

With reference to the second aspect or the first possible implementation manner of the second aspect, in a second possible implementation manner, the sending unit is further configured to send a third packet to the third routing device connected to the apparatus for processing a modified packet, where the third packet carries the first correspondence, and the third routing device is different from the second routing device.

With reference to the second aspect or the first or the second possible implementation manner of the second aspect, in a third possible implementation manner, the first packet obtained by the receiving unit further carries a third correspondence, where the third correspondence includes a correspondence between the network address information of the second routing device and a network type of a network of the second routing device, and the network type includes a UDP network or a GRE network, and the forwarding entry created by the processing unit further includes the third correspondence.

With reference to the third possible implementation manner of the second aspect, in a fourth possible implementation manner, the sending unit is further configured to forward the modified packet to the second routing device according to the network address information of the second routing device by using a forwarding tunnel that is corresponding to the network type of the network of the second routing device, where the forwarding tunnel that is corresponding to the network type of the network of the second routing device is determined according to the third correspondence.

It may be learned from the foregoing technical solutions that a forwarding entry used for forwarding a modified packet between routing devices does not need to be additionally configured for and delivered to a first routing device by a controller. The first routing device may obtain a first packet sent by a second routing device connected to the first routing device, obtain a first correspondence between network address information of the second routing device and an ID of an SF connected to the second routing device, and create the forwarding entry that includes the first correspondence, where the first correspondence is carried in the first packet. Therefore, when the first routing device needs to forward, to the second routing device, the modified packet whose ID of a destination SF is the ID of the SF connected to the second routing device, the first routing device may query the forwarding entry, and obtain the network address information of the second routing device by matching the first correspondence, to complete forwarding. Therefore, a network resource is saved, and a process of creating the forwarding entry is simplified.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To describe the technical solutions in embodiments of the present invention more clearly, how to forward a modified packet on a service chain is first described. FIG. 1 is used as an example. A service chain of a packet includes an SF 1 and an SF 4 successively, and a service chain ID is 55. A specific implementation manner is: a classifier determines, by analyzing a service flow type included in the packet, that a path that the packet passes through is: the classifier→a routing device 1→the SF 1→the routing device 1→a routing device 2→the SF 4→the routing device 2. The classifier adds a service chain header to the packet to obtain a modified packet. The service chain header may include the service chain ID and an ID of an SF, and the ID of an SF may be an ID of a source SF or an ID of a destination SF. When the ID of an SF is an ID of a destination SF, that is, an ID of the SF 1 on the service chain, the ID of the destination SF refers to an ID of a next-hop SF of the current modified packet. When the modified packet reaches the routing device 1, the routing device 1 sends, according to the service chain ID and the ID of the SF 1, the modified packet to the SF 1 connected to the routing device 1. After the SF 1 processes the modified packet, the modified packet is returned to the routing device 1. The routing device 1 determines an ID of the next-hop SF 4 by using the service chain ID, determines a corresponding forwarding entry by using the service chain ID and the ID of the SF 4, and matches network address information of the routing device 2 that is corresponding to the SF 4. The routing device 1 sends the modified packet to the routing device 2 according to the network address information of the routing device 2. The forwarding entry includes a correspondence between a service chain ID, an ID of an SF, and network address information of a routing device, and may be shown in Table 1.

TABLE 1

| Service chain ID | ID of an SF | Network address information of a routing device connected to a next-hop SF |
|---|---|---|
| 55 | ID of an SF 1 | Network address information of a routing device 1 |
| 55 | ID of an SF 4 | Network address information of a routing device 2 |

A controller may be responsible for configuring the forwarding entry for the routing device and delivering the forwarding entry to the routing device, but the controller needs to additionally consume a network resource to obtain the network address information of the routing device, which brings extra data processing load. In the embodiments of the present invention, the forwarding entry used for forwarding the modified packet between routing devices may not need to be additionally configured for and delivered to a first routing device by the controller. The first routing device may obtain, by using a first packet sent by a second routing device connected to the first routing device, a first correspondence between network address information of the second routing device and an ID of an SF connected to the second routing device, and create the forwarding entry that includes the first correspondence, where the first correspondence is carried in the first packet. Therefore, when the first routing device needs to forward, to the second routing device, the modified packet whose ID of a destination SF is the ID of the SF connected to the second routing device, the first routing device may query the forwarding entry, and obtain the network address information of the second routing device by matching the first correspondence, to complete forwarding. Therefore, a network resource is saved, and a process of creating the forwarding entry is simplified.

In addition to creating the forwarding entry for the second routing device according to the first packet sent by the second routing device, the first routing device may further send, by using a second packet, a second correspondence to a third routing device connected to the first routing device, and the second correspondence includes a correspondence between an ID of an SF connected to the first routing device and network address information of the first routing device. The third routing device may create a forwarding entry according to the second correspondence in the second packet, and the forwarding entry may be understood as being for the first routing device. The first routing device may further send the first correspondence obtained from the second routing device to the third routing device by using a third packet, so that the third routing device may further create a forwarding entry, and the forwarding entry may be understood as being for the second routing device. In a manner of diffusing, between routing devices, a correspondence between an ID of an SF and a routing device connected to the SF, the routing device may not only obtain a correspondence between network address information of a connected routing device and an ID of an SF connected to the connected routing device, but also obtain a correspondence between network address information of another connected routing device in a network topology and an ID of an SF connected to the another routing device, and accordingly create a forwarding entry for the another routing device. Therefore, compatibility of the routing device in the network topology and a capability of forwarding a modified packet are improved.

In addition, the first packet received by the first routing device may further include a third correspondence, and the third correspondence includes a correspondence between the network address information of the second routing device and a network type of a network of the second routing device, so that the forwarding entry created by the first routing device for the second routing device further includes the third correspondence. When forwarding the modified packet to the second routing device, the first routing device may select a tunnel corresponding to the network type of the second routing device to forward the modified packet, where the network type of the second routing device is a user datagram protocol (UDP) network, a generic routing encapsulation (GRE) network, or the like. Therefore, efficiency of forwarding the modified packet is further improved.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 2:
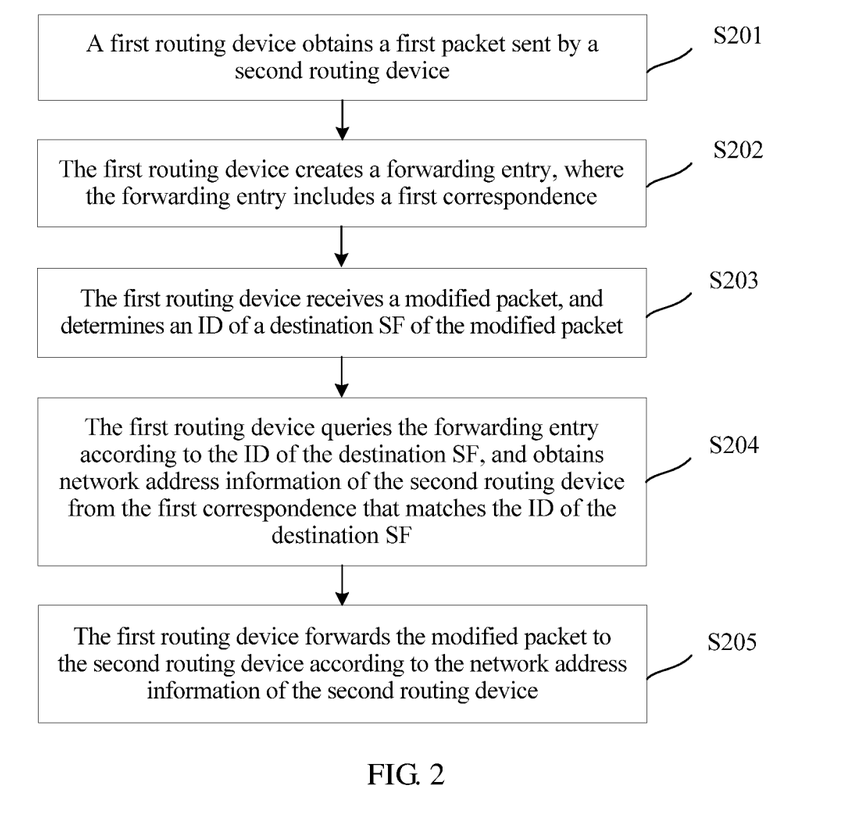
FIG. 2 is a flowchart of a method for processing a modified packet according to an embodiment.

FIG. 2 is a flowchart of a method for processing a modified packet according to an embodiment of the present invention. The method shown in FIG. 2 includes the following content.

S201. A first routing device obtains a first packet sent by a second routing device, where the first packet carries a first correspondence, the first correspondence includes a correspondence between network address information of the second routing device and an ID of an SF connected to the second routing device, and the second routing device is connected to the first routing device.

It should be noted herein that, for such a connection relationship between an SF and a routing device, reference may be made to a connection relationship shown in FIG. 1. As shown in FIG. 1, an SF 1, an SF 2, and an SF 3 are connected to a routing device 1, and an SF 4 and an SF 5 are connected to a routing device 2. Such a connection relationship between an SF and a routing device cannot be understood as a connection between the SF 1 and the routing device 2. Such a connection relationship between an SF and a routing device may also be referred to as attachment in the aft. When an SF is connected to the second routing device, the second routing device may obtain, by using a discovery protocol packet or a handshake protocol packet interacted between the second routing device and the SF, a correspondence between an ID of the SF and interface information of an interface that is of the second routing device and by using which the second routing device is connected to the SF. Optionally, the second routing device usually stores, in a local SF attachment table, the correspondence between the ID of the SF and the interface information of the interface of the second routing device for connecting to the SF. It is assumed that the second routing device is connected to totally three SFs, and IDs of the three SFs are respectively an SF 1, an SF 2, and an SF 3. The local SF attachment table of the second routing device may be shown in Table 2.

TABLE 2

| ID of an SF | Interface information of an interface of a routing device for connecting to an SF |
|---|---|
| SF 1 | Interface 1 |
| SF 2 | Interface 2 |
| SF 3 | Interface 3 |

When the second routing device is to send the first packet, the second routing device may extract the IDs of the three SFs connected to the second routing device from the local SF attachment table, determine the first correspondence between the IDs of the three SFs connected to the second routing device and the network address information of the second routing device, and add the first correspondence to the first packet. The network address information of the second routing device may be a network address used to identify the second routing device, or may be a network address used to identify a network interface of the second routing device for connecting to another routing device. The network address may be an IP address, a MAC address, or the like, or may be a tunnel port address of a forwarding tunnel established between the second routing device and the first routing device, such as a GRE tunnel address or a UDP port address.

S202. The first routing device creates a forwarding entry, where the forwarding entry includes the first correspondence, and the network address information of the second routing device in the forwarding entry indicates address information of a next-hop routing device of the first routing device on a service chain.

It is assumed that the second routing device is connected to totally three SFs, and IDs of the three SFs are respectively an SF 1, an SF 2, and an SF 3, the forwarding entry created by the first routing device may be shown in Table 3.

TABLE 3

| ID of an SF | Network address information of a routing device connected to an SF |
|---|---|
| SF 1 | Network address information of a second routing device |
| SF 2 | Network address information of a second routing device |
| SF 3 | Network address information of a second routing device |

In S202, the first routing device creates the forwarding entry, and the forwarding entry may be understood as being for the second routing device. When the first routing device needs to forward a modified packet to the second routing device, the first routing device may determine the network address information of the second routing device by querying the forwarding entry. The following further describes the forwarding entry by describing how the first routing device forwards the modified packet by using the forwarding entry.

S203. The first routing device receives a modified packet, and determines an ID of a destination SF of the modified packet.

It should be noted herein that the modified packet mentioned in this embodiment of the present invention mainly refers to a packet to which a service chain header is added and that is forwarded on the service chain.

Figure 3:
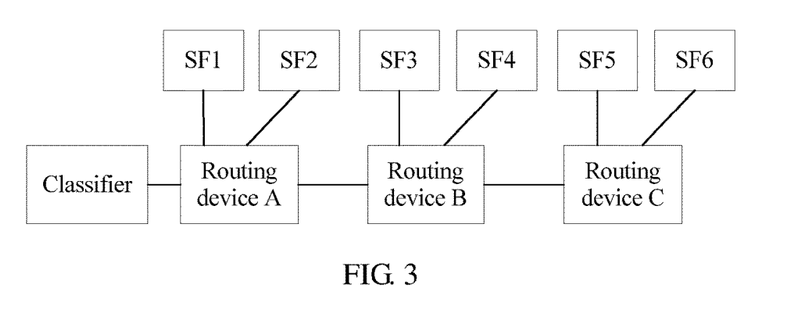
FIG. 3 is a schematic diagram of a network for forwarding a modified packet according to an embodiment.

The following describes how the first routing device determines the ID of the destination SF of the modified packet by using several cases of forwarding the modified packet. FIG. 3 is a schematic diagram of a network for forwarding a modified packet according to an embodiment of the present invention. As shown in FIG. 3, a classifier, a routing device A, a routing device B, and a routing device C are included. Each routing device is connected to two SFs, and total six SFs are respectively an SF 1 to an SF 6.

A first case of forwarding the modified packet:

It is assumed that a path that the modified packet sent by the classifier needs to pass through includes: the routing device A→the SF 1→the routing device A→the routing device B→the SF 3→the routing device B. It is assumed that the routing device A is the first routing device, and the routing device B is the second routing device.

When the modified packet is sent to the routing device A from the classifier, the service chain header of the modified packet includes a service chain ID and an ID of the SF 1. The routing device A further has an SF forwarding entry that is for the service chain ID, and the SF forwarding entry includes a correspondence between a service chain ID and an SF. It is assumed that the service chain ID is 100, and the SF forwarding entry may be shown in Table 4a. When the ID of the destination SF is the SF 1, an ID of a corresponding source SF is not shown in Table 4a. The SF 1 is a first SF on the path that the modified packet needs to pass through. Therefore, the modified packet has not been processed by an SF before reaching the SF 1, and there is no ID of a source SF. In another possible implementation manner, an ID of a corresponding source SF when the ID of the destination SF is the SF 1 may also be set as a preset specific identifier for representation.

TABLE 4a

| Service chain ID | ID of a source SF | ID of a destination SF |
|---|---|---|
| 100 |  | SF 1 |
| 100 | SF 1 | SF 3 |

The routing device A sends the modified packet to the SF 1, and the routing device A receives the modified packet returned from the SF 1. In this case, the service chain header of the modified packet includes the service chain ID: 100 and the ID of the source SF: the SF 1. The first routing device determines, by querying the SF forwarding entry shown in Table 4a, that an ID of a next-hop SF, that is, the ID of the destination SF, is the SF 3.

A second case of forwarding the modified packet:

It is assumed that a path that the modified packet sent by the classifier needs to pass through includes: the routing device A→the routing device B→the SF 3→the routing device B. It is assumed that the routing device A is the first routing device, and the routing device B is the second routing device.

The routing device A has an SF forwarding entry. It is assumed that a service chain ID is 110, and the SF forwarding entry is shown in Table 4b. When the ID of the destination SF is the SF 3, an ID of a corresponding source SF is not shown in Table 4b. The SF 3 is a first SF on the path that the modified packet needs to pass through. Therefore, the modified packet has not been processed by an SF before reaching the SF 3, and there is no ID of a source SF.

TABLE 4b

| Service chain ID | ID of a source SF | ID of a destination SF |
|---|---|---|
| 110 | | SF 3 |

When the modified packet is sent to the routing device A from the classifier, the service chain header of the modified packet includes the service chain ID and an ID of the SF 3. The routing device A may directly determine the ID of the destination SF of the modified packet by using Table 4b and the ID of the SF 3 included in the service chain header.

It should further be noted that the network topology structure shown in FIG. 3 is merely an example. The network topology structure is not limited to only three routing devices, and a connection relationship between routing devices is not limited to a chain connection shown in FIG. 3, and may also be a mesh structure or the like. The present invention imposes no limitation on a quantity of routing devices in a network topology structure formed by the routing devices and a connection relationship between the routing devices.

S204. The first routing device queries the forwarding entry according to the ID of the destination SF, obtains the network address information of the second routing device from the first correspondence that matches the ID of the destination SF, and determines that an SF identified by the ID of the destination SF is the SF connected to the second routing device.

FIG. 3 is used as an example. The routing device A (that is, the first routing device) queries the forwarding entry according to the ID of the destination SF: the SF 3, and the forwarding entry is shown in Table 5:

TABLE 5

| ID of an SF | Network address information of a routing device connected to an SF |
|---|---|
| SF 3 | Network address information of a routing device B |
| SF 4 | Network address information of a routing device B |

The network address information of the routing device B (that is, the second routing device) is obtained from the first correspondence that matches the SF 3, and accordingly, the SF 3 (the ID of the destination SF) is an ID of one of SFs connected to the second routing device.

S205. The first routing device forwards the modified packet to the second routing device according to the network address information of the second routing device.

In the routing device, a service forwarding entity (SFE) may perform a function of forwarding the modified packet on the service chain.

It may be learned from the embodiment corresponding to FIG. 2 that a forwarding entry used for forwarding a modified packet between routing devices does not need to be additionally configured for and delivered to a first routing device by a controller. The first routing device may obtain a first correspondence by using a first packet sent by a second routing device connected to the first routing device, and create the forwarding entry that includes the first correspondence. Therefore, when the first routing device needs to forward, to the second routing device, the modified packet whose ID of a destination SF is an ID of an SF connected to the second routing device, the first routing device may query the forwarding entry, and obtain network address information of the second routing device by matching the first correspondence, to complete forwarding. Therefore, a network resource is saved, and a process of creating the forwarding entry is simplified.

In addition to creating the forwarding entry for the second routing device according to the first packet sent by the second routing device, the first routing device may further send, by using a second packet, a second correspondence between an ID of an SF connected to the first routing device and network address information of the first routing device to a third routing device connected to the first routing device, so that the third routing device may create a forwarding entry for the first routing device according to the second correspondence in the second packet.

Figure 4:
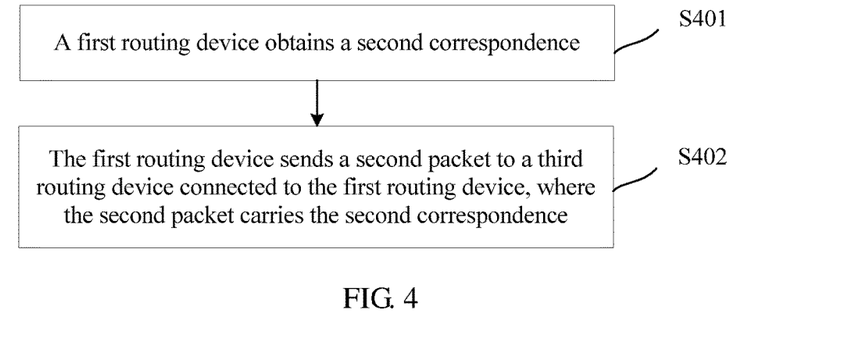
FIG. 4 is a flowchart of a method for creating a forwarding entry according to an embodiment.

Based on the embodiment shown in FIG. 2, FIG. 4 is a flowchart of a method for creating a forwarding entry according to an embodiment of the present invention. As shown in FIG. 4, the method includes the following steps.

S401. The first routing device obtains a second correspondence, where the second correspondence is a correspondence between network address information of the first routing device and an ID of an SF connected to the first routing device.

Similar to the description in S201, when being connected to an SF, the first routing device may further obtain a correspondence between an ID of the SF and port information of a port that is of the first routing device and by using which the first routing device is connected to the SF. Optionally, the first routing device may further store a local SF attachment table similar to Table 2. When the first routing device is to send the second packet, the first routing device may extract, from the local SF attachment table, the ID of the SF connected to the first routing device, and determine the second correspondence between the ID of the SF connected to the first routing device and the network address information of the first routing device.

S402. The first routing device sends a second packet to a third routing device connected to the first routing device, where the second packet carries the second correspondence.

When the third routing device receives the second packet, the third routing device may create a forwarding entry that includes the second correspondence. When the third routing device needs to forward the modified packet to the first routing device, the third routing device may determine the network address information of the first routing device by querying the forwarding entry that includes the second correspondence.

It should be noted that in S402, whether the second routing device and the third routing device are same routing devices is not limited. Therefore, when the second routing device and the third routing device are same routing devices, S402 may be considered as: the first routing device sends, to the second routing device, the second packet that carries the second correspondence. The second routing device may create a forwarding entry that includes the second correspondence. When the third routing device, that is, the second routing device, needs to forward the modified packet on the service chain to the first routing device, the third routing device may determine the network address information of the first routing device by querying the forwarding entry that includes the second correspondence.

When the third routing device and the second routing device are different devices, the first routing device may further send the first correspondence obtained from the second routing device to the third routing device by using a third packet, so that the third routing device may further create a forwarding entry for the second routing device. In this case, the second packet and the third packet may be same packets, and the third packet (that is, the second packet) may carry both the first correspondence and the second correspondence.

That is, optionally, the first routing device sends a third packet to the third routing device connected to the first routing device. The third packet carries the first correspondence, and the third routing device is different from the second routing device.

It should be noted herein that the first correspondence is the correspondence between the network address information of the second routing device and the ID of the SF connected to the second routing device. If the third packet that includes the first correspondence is further sent to the second routing device, a packet broadcast storm may be caused in a network topology formed by the routing devices. Therefore, when the first routing device sends the third packet to the third routing device, the third routing device is not the second routing device that already has the first correspondence.

FIG. 3 is used as an example. It is assumed that the routing device A is the third routing device, the routing device B is the first routing device, and the routing device C is the second routing device. The routing device B obtains the first packet that is sent by the routing device C connected to the routing device B and that carries the first correspondence. A forwarding entry that is accordingly created by the routing device B for the routing device C is shown in Table 6:

TABLE 6

| IB of an SF | Network address information of a routing device connected to an SF |
| --- | --- |
| SF 5 | Network address information of a routing device C |
| SF 6 | Network address information of a routing device C |

The routing device B sends, to the connected routing device A, the second packet that carries the second correspondence, so that the routing device A creates a forwarding entry for the routing device B. The forwarding entry for the routing device B may be shown in Table 5. The routing device B may further send, to the routing device A, the third packet that carries the first correspondence, so that the routing device A creates a forwarding entry for the routing device C. The forwarding entry for the routing device C may be shown in Table 6.

It is assumed that a path that the modified packet sent by the classifier needs to pass through includes: the routing device A→the SF 1→the routing device A→the routing device B→the routing device C→the SF 5→the routing device C.

When the modified packet is sent to the routing device A from the classifier, the service chain header of the modified packet includes the service chain ID and the ID of the SF 1. It is assumed that the service chain ID is 120, the SF forwarding entry that is on the routing device A and that is for the service chain ID may be shown in Table 7:

TABLE 7

| Service chain ID | ID of a source SF | ID of a destination SF |
| --- | --- | --- |
| 120 | | SF 1 |
| 120 | SF 1 | SF 5 |

The routing device A sends the modified packet to the SF 1, and the routing device A receives the modified packet returned from the SF 1. In this case, the service chain header of the modified packet includes the service chain ID: 120 and an ID of a source SF: the SF1. The first routing device determines, by querying the SF forwarding entry shown in Table 7, that an ID of a next-hop SF, that is, the ID of the destination SF, is the SF 5. The routing device A determines, by querying Table 6, network address information of the routing device C connected to the SF 5, and accordingly determines that the ID of the destination SF of the modified packet is an ID of an SF connected to the routing device C (that is, the second routing device). The routing device A may send the modified packet to the routing device C in an IP routing manner according to a connection relationship.

In a manner of diffusing, between routing devices, a correspondence between network address information of a routing device and an ID of an SF connected to the routing device, the routing device may not only obtain a correspondence between network address information of a directly connected routing device and an ID of an SF connected to the directly connected routing device, but also obtain a correspondence between network address information of another routing device in a network topology and an ID of an SF connected to the another routing device, and accordingly create a forwarding entry for the another routing device. Therefore, compatibility of the routing device in the network topology and a capability of forwarding a modified packet are improved.

The following describes types of the first packet, the second packet, and the third packet. To save a network resource, the first packet, the second packet, and the third packet may be control protocol packets between routing devices. The first packet is used as an example for description. For example, when a control protocol run by the first router and the second router is the Border Gateway Protocol (BGP), the first packet may be a BGP packet. A multi-protocol network layer reachability information (MP_REACH_NLRI) part of the BGP packet may be used to carry the first correspondence. A format of the MP_REACH_NLRI part used to carry the first correspondence may be shown in Table 8:

TABLE 8

| Network address information of a second routing device |
| --- |
| ID list of an SF |

The ID list of an SF includes an ID or IDs of one or more SFs that is or are connected to the second routing device. When there are IDs of multiple SFs: an SF 1 to an SF n, a specific format of the MP_REACH_NLRI part used to carry the first correspondence may be shown in Table 8a or Table 8b:

TABLE 8a

| Network address information of a second routing device |
| --- |
| SF 1 |
| SF 2 |
| ... |
| SF n |

TABLE 8b

| Network address information of a second routing device |
| --- |
| SF 1 |
| SF 2 |
| ... |
| SF n |

For example, when the control protocol run by the first router and the second router is the Label Distribution Protocol (LDP), the first correspondence may be carried by extending and defining a new type-length-value (TLV) type, or the first correspondence may be carried by extending a new forwarding equivalence class (FEC) based on an existing LDP mapping message.

To further reduce volumes of data carried in the first packet, the second packet, and the third packet, the IDs of the SFs may further be aggregated. The first packet is used as an example for description. For example, in some cases, multiple SFs connected to the second routing device are separately an SF 1, an SF 2, and an SF 3, and IDs of the three SFs are defined as: an ID of the SF 1 is 0000 0001, where the first four digits 0000 are a prefix, and the last four digits 0001 are a suffix; an ID of the SF 2 is 0000 0002, where the first four digits 0000 are a prefix, and the last four digits 0002 are a suffix; and an ID of the SF 3 is 0000 0003, where the first four digits 0000 are a prefix, and the last four digits 0003 are a suffix. Prefixes of the IDs of the SFs connected to the second routing device are the same, and prefixes of IDs of SFs connected to the first routing device are different. The three SFs have same prefixes. Therefore, the second routing device may represent the ID of the SF in the first correspondence by using a prefix of the ID of the SF, to reduce the volume of data carried in the first packet.

In addition to adding the first correspondence to the first packet, the second routing device may further carry a network type of a network of the second routing device, such as a GRE network. In this way, when forwarding the modified packet on the service chain to the second routing device, the first routing device may further select a corresponding forwarding tunnel according to the network type of the network of the second routing device, to perform forwarding.

Figure 5:
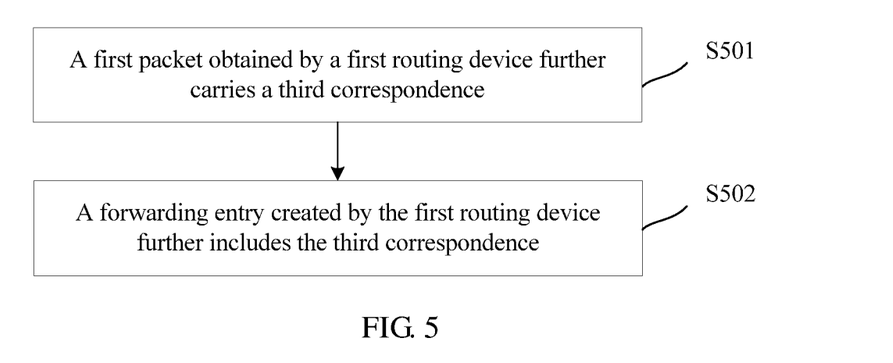
FIG. 5 is a flowchart of a method for creating a forwarding entry according to an embodiment.

Optionally, based on the embodiment shown in FIG. 2 or FIG. 4, FIG. 5 is a flowchart of a method for creating a forwarding entry according to an embodiment of the present invention. As shown in FIG. 5, the method includes the following steps.

S501. The first packet obtained by the first routing device further carries a third correspondence, where the third correspondence includes a correspondence between the network address information of the second routing device and a network type of a network of the second routing device, and the network type includes a UDP network or a GRE network.

S502. The forwarding entry created by the first routing device further includes the third correspondence.

It should be noted that the second packet may further carry a correspondence between the network address information of the first routing device and a network type of a network of the first routing device, and the third packet may also carry the correspondence between the network address information of the first routing device and the network type of the network of the first routing device. The present invention sets no limitation thereto.

FIG. 3 is used as an example for description. The routing device A is the first routing device, and the routing device B is the second routing device.

The routing device A obtains the first packet that is sent by the routing device B and that carries the first correspondence and the third correspondence. It is assumed that a network type of a network of the routing device B is a GRE network, the forwarding entry created by the routing device A according to the first correspondence and the third correspondence may be shown in Table 9:

TABLE 9

| ID of an SF | Network address information of a routing device connected to an SF | Network type of a network of a routing device connected to an SF |
| --- | --- | --- |
| SF 3 | Network address information of a routing device B | GRE network |
| SF 4 | Network address information of a routing device B | GRE network |

In this way, when the routing device A needs to forward the modified packet on the service chain to the routing device B, for example, when the ID of the destination SF of the modified packet is the SF 3, by querying Table 9, the routing device A determines network address information of the routing device B connected to the SF 3 and determines that a network of the routing device B is a GRE network. The routing device A may forward the modified packet to the routing device B by using a forwarding tunnel corresponding to the GRE network.

That is, based on the embodiment shown in FIG. 5, optionally, that the first routing device forwards the modified packet to the second routing device according to the network address information of the second routing device includes:

forwarding, by the first routing device, the modified packet to the second routing device according to the network address information of the second routing device by using a forwarding tunnel that is corresponding to the network type of the network of the second routing device, where the forwarding tunnel that is corresponding to the network type of the network of the second routing device is determined according to the third correspondence.

It may be learned that a forwarding entry used for forwarding a modified packet between routing devices does not need to be additionally configured for and delivered to a first routing device by a controller. The first routing device may obtain a first packet sent by a second routing device connected to the first routing device, obtain a first correspondence between network address information of the second routing device and an ID of an SF connected to the second routing device, and create the forwarding entry that includes the first correspondence, where the first correspondence is carried in the first packet. Therefore, when the first routing device needs to forward, to the second routing device, the modified packet whose ID of a destination SF is the ID of the SF connected to the second routing device, the first routing device may query the forwarding entry, and obtain the network address information of the second routing device by matching the first correspondence, to complete forwarding. Therefore, a network resource is saved, and a process of creating the forwarding entry is simplified.

In a manner of diffusing, between routing devices, a correspondence between an ID of an SF and a routing device connected to the SF, a routing device may not only obtain a correspondence between network address information of a connected routing device and an ID of an SF connected to the connected routing device, but also obtain a correspondence between network address information of another connected routing device in a network topology and an ID of an SF connected to the another routing device, and accordingly create a forwarding entry for the another routing device. Therefore, compatibility of the routing device in the network topology and a capability of forwarding a modified packet are improved.

In addition, the first packet received by the first routing device may further include a third correspondence between the network address information of the second routing device and a network type of the second routing device, so that the first routing device may select a corresponding forwarding tunnel to forward the modified packet to the second routing device, and efficiency of forwarding the modified packet is further improved.

Figure 6:
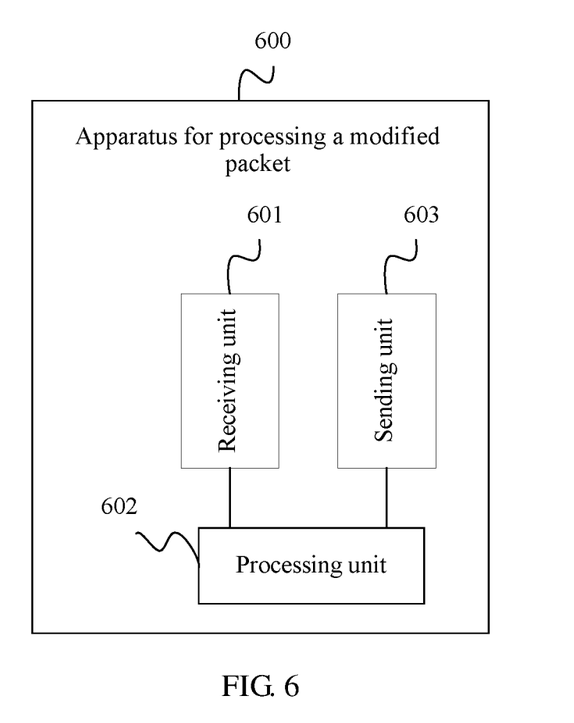
FIG. 6 is a structural diagram of an apparatus for processing a modified packet according to an embodiment.

FIG. 6 is a structural diagram of an apparatus for processing a modified packet according to an embodiment of the present invention. As shown in FIG. 6, an apparatus 600 for processing a modified packet includes a receiving unit 601, a processing unit 602, and a sending unit 603.

The receiving unit 601 is configured to obtain a first packet sent by a second routing device, where the first packet carries a first correspondence, the first correspondence includes a correspondence between network address information of the second routing device and an ID of an SF connected to the second routing device, and the second routing device is connected to the apparatus 600 for processing a modified packet.

It should be noted herein that, for such a connection relationship between an SF and a routing device, reference may be made to a connection relationship shown in FIG. 1. As shown in FIG. 1, an SF 1, an SF 2, and an SF 3 are connected to a routing device 1, and an SF 4 and an SF 5 are connected to a routing device 2. Such a connection relationship between an SF and a routing device cannot be understood as a connection between the SF 1 and the routing device 2. Such a connection relationship between an SF and a routing device may also be referred to as attachment in the aft. When an SF is connected to the second routing device, the second routing device may obtain, by using a discovery protocol packet or a handshake protocol packet interacted between the second routing device and the SF, a correspondence between an ID of the SF and interface information of an interface that is of the second routing device and by using which the second routing device is connected to the SF. Optionally, the second routing device usually stores, in a local SF attachment table, the correspondence between the ID of the SF and the interface information of the interface of the second routing device for connecting to the SF. It is assumed that the second routing device is connected to totally three SFs, and IDs of the three SFs are respectively an SF 1, an SF 2, and an SF 3, the local SF attachment table of the second routing device may be shown in Table 2.

When the second routing device is to send the first packet, the second routing device may extract the IDs of the three SFs connected to the second routing device from the local SF attachment table, determine the first correspondence between the IDs of the three SFs connected to the second routing device and the network address information of the second routing device, and add the first correspondence to the first packet. The network address information of the second routing device may be a network address used to identify the second routing device, or may be a network address used to identify a network interface of the second routing device for connecting to another routing device. The network address may be an IP address, a MAC address, or the like, or may be a tunnel port address of a forwarding tunnel established between the second routing device and the apparatus 600 for processing a modified packet, such as a GRE tunnel address or a UDP port address.

The processing unit 602 is configured to create a forwarding entry, where the forwarding entry includes the first correspondence, and the network address information of the second routing device in the forwarding entry indicates address information of a next-hop routing device, on a service chain, of the apparatus 600 for processing a modified packet.

It is assumed that the second routing device is connected to totally three SFs, and IDs of the three SFs are respectively an SF 1, an SF 2, and an SF 3, the forwarding entry created by the apparatus 600 for processing a modified packet may be shown in Table 3.

The processing unit 602 creates the forwarding entry, and the forwarding entry may be understood as being for the second routing device. When the sending unit 603 needs to forward the modified packet to the second routing device, the network address information of the second routing device may be determined by querying the forwarding entry. The following further describes the forwarding entry by describing how to forward the modified packet by using the forwarding entry.

The receiving unit 601 is further configured to receive the modified packet, and determine an ID of a destination SF of the modified packet.

Description of how the receiving unit 601 determines the ID of the destination SF of the modified packet is similar to description in S203 in the embodiment corresponding to FIG. 2, and is not described herein again.

The processing unit 602 is further configured to: query the forwarding entry according to the ID of the destination SF, obtain the network address information of the second routing device from the first correspondence that matches the ID of the destination SF, and determine that an SF identified by the ID of the destination SF is the SF connected to the second routing device.

FIG. 3 is used as an example. The forwarding entry created by the routing device A may be shown in Table 5. It is assumed that when the ID of the destination SF of the modified packet is the SF 3, by querying Table 5, network address information of a routing device B (that is, the second routing device) is obtained from the first correspondence that matches the SF 3. Accordingly, the SF 3 (the ID of the destination SF) is an ID of one of SFs connected to the second routing device.

The sending unit 603 is configured to forward the modified packet to the second routing device according to the network address information of the second routing device.

In the routing device, an SFE may perform a function of forwarding the modified packet on the service chain.

It may be learned from the embodiment corresponding to FIG. 6 that a forwarding entry used for forwarding a modified packet between routing devices does not need to be additionally configured for and delivered to the apparatus 600 for processing a modified packet by a controller. The apparatus 600 for processing a modified packet may obtain the first correspondence by using a first packet sent by a second routing device connected to the apparatus 600 for processing a modified packet, and create the forwarding entry that includes the first correspondence. In this way, when the apparatus 600 for processing a modified packet needs to forward, to the second routing device, the modified packet whose ID of a destination SF is an ID of an SF connected to the second routing device, the apparatus 600 for processing a modified packet may query the forwarding entry, and obtain network address information of the second routing device by matching the first correspondence, to complete forwarding. Therefore, a network resource is saved, and a process of creating the forwarding entry is simplified.

In addition to creating the forwarding entry for the second routing device according to the first packet sent by the second routing device, the apparatus 600 for processing a modified packet may further send, by using a second packet, a second correspondence between an ID of an SF connected to the apparatus 600 for processing a modified packet and network address information of the apparatus 600 for processing a modified packet to a third routing device connected to the apparatus 600 for processing a modified packet, so that the third routing device may create, according to the second correspondence in the second packet, a forwarding entry for the apparatus 600 for processing a modified packet.

That is, optionally, the receiving unit 601 is further configured to obtain a second correspondence, where the second correspondence is a correspondence between network address information of the apparatus 600 for processing a modified packet and an ID of an SF connected to the apparatus 600 for processing a modified packet.

When being connected to an SF, the receiving unit 601 may further obtain a correspondence between an ID of the SF and port information of a port that is of the apparatus 600 for processing a modified packet and by using which the apparatus 600 for processing a modified packet is connected to the SF. Optionally, the apparatus 600 for processing a modified packet may further store a local SF attachment table similar to Table 2. When the apparatus 600 for processing a modified packet is to send the second packet, the receiving unit 601 may extract, from the local SF attachment table, the ID of the SF connected to the apparatus 600 for processing a modified packet, and determine the second correspondence between the ID of the SF connected to the apparatus 600 for processing a modified packet and the network address information of the apparatus 600 for processing a modified packet.

The sending unit 603 is further configured to send a second packet to a third routing device connected to the apparatus 600 for processing a modified packet, where the second packet carries the second correspondence.

When the third routing device receives the second packet, the third routing device may create a forwarding entry that includes the second correspondence. When the third routing device needs to forward the modified packet to the apparatus 600 for processing a modified packet, the third routing device may determine, by querying the forwarding entry that includes the second correspondence, the network address information of the apparatus 600 for processing a modified packet.

It should be noted that whether the second routing device and the third routing device are same routing devices is not limited herein. Therefore, when the second routing device and the third routing device are same routing devices, the sending unit 603 may be considered as: sending, to the second routing device, the second packet that carries the second correspondence. The second routing device may create a forwarding entry that includes the second correspondence. When the third routing device, that is, the second routing device, needs to forward the modified packet on the service chain to the apparatus 600 for processing a modified packet, the third routing device may determine, by querying the forwarding entry that includes the second correspondence, the network address information of the apparatus 600 for processing a modified packet.

When the third routing device and the second routing device are different devices, the sending unit 603 may further send the first correspondence obtained from the second routing device to the third routing device by using a third packet, so that the third routing device may further create a forwarding entry for the second routing device. In this case, the second packet and the third packet may be same packets, and the third packet (that is, the second packet) may carry both the first correspondence and the second correspondence.

That is, optionally, the sending unit 603 is further configured to send the third packet to a third routing device connected to the apparatus 600 for processing a modified packet, where the third packet carries the first correspondence, and the third routing device is different from the second routing device.

It should be noted herein that the first correspondence is the correspondence between the network address information of the second routing device and the ID of the SF connected to the second routing device. If the sending unit 603 further sends the third packet that includes the first correspondence to the second routing device, a packet broadcast storm may be caused in a network topology formed by the routing devices. Therefore, when the sending unit 603 sends the third packet to the third routing device, the third routing device is not the second routing device that already has the first correspondence.

In addition to adding the first correspondence to the first packet, the second routing device may further carry a network type of a network of the second routing device, such as a GRE network. In this way, when forwarding the modified packet on the service chain to the second routing device, the apparatus 600 for processing a modified packet may further select a corresponding forwarding tunnel according to the network type of the network of the second routing device, to perform forwarding.

That is, optionally, the first packet obtained by the receiving unit 601 further carries a third correspondence. The third correspondence includes a correspondence between the network address information of the second routing device and a network type of a network of the second routing device, and the network type includes a UDP network or a GRE network.

The forwarding entry created by the processing unit 602 further includes the third correspondence.

It should be noted that the second packet may further carry a correspondence between the network address information of the apparatus 600 for processing a modified packet and a network type of a network of the apparatus 600 for processing a modified packet. The third packet may also carry the correspondence between the network address information of the apparatus 600 for processing a modified packet and the network type of the network of the apparatus 600 for processing a modified packet. The present invention sets no limitation thereto.

When the first packet obtained by the receiving unit 601 further carries the third correspondence, the sending unit 603 is further configured to forward the modified packet to the second routing device according to the network address information of the second routing device by using a forwarding tunnel that is corresponding to the network type of the network of the second routing device, where the forwarding tunnel that is corresponding to the network type of the network of the second routing device is determined according to the third correspondence.

It may be learned that a forwarding entry used for forwarding a modified packet between routing devices does not need to be additionally configured for and delivered to the apparatus 600 for processing a modified packet by a controller. The apparatus 600 for processing a modified packet may obtain a first packet sent by a second routing device connected to the apparatus 600 for processing a modified packet, obtain a first correspondence between network address information of the second routing device and an ID of an SF connected to the second routing device, and create the forwarding entry that includes the first correspondence, where the first correspondence is carried in the first packet. In this way, when the apparatus 600 for processing a modified packet needs to forward, to the second routing device, the modified packet whose ID of a destination SF is the ID of the SF connected to the second routing device, the apparatus 600 for processing a modified packet may query the forwarding entry, and obtain the network address information of the second routing device by matching the first correspondence, to complete forwarding. Therefore, a network resource is saved, and a process of creating the forwarding entry is simplified.

In a manner of diffusing, between routing devices, a correspondence between an ID of an SF and a routing device connected to the SF, a routing device may not only obtain a correspondence between network address information of a connected routing device and an ID of an SF connected to the connected routing device, but also obtain a correspondence between network address information of another connected routing device in a network topology and an ID of an SF connected to the another routing device, and accordingly create a forwarding entry for the another routing device. Therefore, compatibility of the routing device in the network topology and a capability of forwarding a modified packet are improved.

In addition, the first packet received by the apparatus 600 for processing a modified packet may further include a third correspondence between the network address information of the second routing device and a network type of the second routing device, so that the apparatus 600 for processing a modified packet may select a corresponding tunnel to forward the modified packet to the second routing device. Therefore, efficiency of forwarding the modified packet is further improved.

Figure 7:
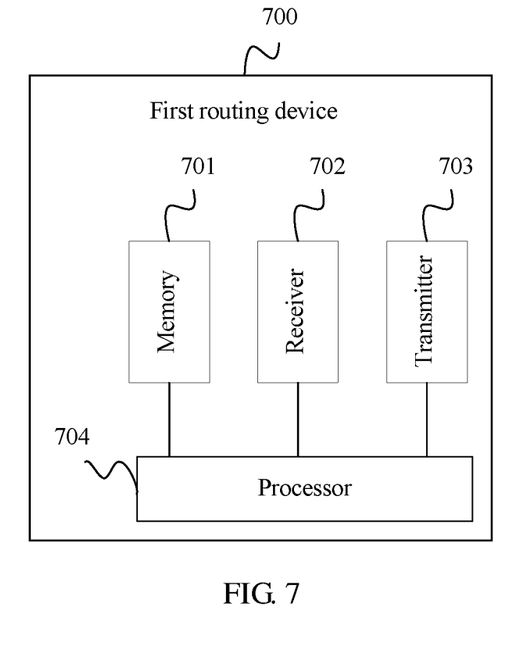
FIG. 7 is a schematic diagram of a hardware structure of a first routing device according to an embodiment.

Referring to FIG. 7, FIG. 7 is a schematic diagram of a hardware structure of a first routing device according to an embodiment of the present invention. A first routing device 700 includes a memory 701, a receiver 702, a transmitter 703, and a processor 704 that is connected to each of the memory 701, the receiver 702, and the transmitter 703. The memory 701 is configured to store a group of program instruction, and the processor 704 is configured to invoke the program instruction stored in the memory 701 to perform the following operations. Triggering the receiver 702 to obtain a first packet sent by a second routing device, where the first packet carries a first correspondence, the first correspondence includes a correspondence between network address information of the second routing device and an ID of an SF connected to the second routing device, and the second routing device is connected to the first routing device. Creating a forwarding entry, where the forwarding entry includes the first correspondence, and the network address information of the second routing device in the forwarding entry indicates address information of a next-hop routing device of the first routing device on a service chain. Triggering the receiver 702 to receive a modified packet and determine an ID of a destination SF of the modified packet. Querying the forwarding entry according to the ID of the destination SF, obtaining the network address information of the second routing device from the first correspondence that matches the ID of the destination SF, and determining that an SF identified by the ID of the destination SF is the SF connected to the second routing device. Triggering the transmitter 703 to forward the modified packet to the second routing device according to the network address information of the second routing device.

Optionally, the processor 704 may be a central processing unit (CPU), the memory 701 may be an internal memory of a random access memory (RAM) type, the receiver 702 and the transmitter 703 may include a common physical interface, and the physical interface may be an Ethernet (Ethernet) interface or an asynchronous transfer mode (ATM) interface. The processor 704, the transmitter 703, the receiver 702, and the memory 701 may be integrated into one or more independent circuits or one or more pieces of hardware, for example, an application-specific integrated circuit (ASIC).

The word "first" in a first routing device, a first packet, and a first correspondence that are mentioned in the embodiments of the present invention is merely used as a name identifier, and does not mean being the first in a sequence. For the words "second" and "third", this rule also applies.

It should be noted that persons of ordinary skill in the art may understand that all or a part of the processes of the methods in the embodiments may be implemented by a computer program instructing relevant hardware. The program may be stored in a computer readable storage medium. When the program runs, the processes of the method embodiments are performed. The foregoing storage medium may include: a magnetic disk, an optical disc, a read-only memory (ROM), a random access memory (RAM), or the like.

The method and the apparatus for processing a modified packet provided in the present invention are described in detail above. The principle and implementation of the present invention are described herein by using specific embodiments. The description about the foregoing embodiments is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:
1. A method, comprising:
 obtaining, by a first routing device, a first packet sent by a second routing device, wherein the first packet carries a first correspondence, wherein the first correspondence comprises a correspondence between network address information of the second routing device and an identifier (ID) of a service function (SF) node;
 storing, by the first routing device, the first correspondence;

receiving, by the first routing device, a second packet, wherein the second packet carries a service chain ID and an ID of a source SF node;

determining, by the first routing device, an ID of the SF node to process the second packet according to the service chain ID, further according to the ID of the source SF node and further according to a correspondence associated with the service chain ID, the ID of the source SF and the ID of the SF node; and forwarding, by the first routing device, the second packet to the second routing device according to the first correspondence.

2. The method according to claim 1, wherein the method further comprises:

obtaining, by the first routing device, a second correspondence, wherein the second correspondence is a correspondence between network address information of the first routing device and an ID of an SF node connected to the first routing device; and sending, by the first routing device, a third packet to a third routing device connected to the first routing device, wherein the third packet carries the second correspondence.

3. The method according to claim 2, wherein the method further comprises:

sending, by the first routing device, a fourth packet to the third routing device connected to the first routing device, wherein the fourth packet carries the first correspondence, and wherein the third routing device is different from the second routing device.

4. The method according to claim 1, wherein the first packet obtained by the first routing device further carries a third correspondence, wherein the third correspondence comprises a correspondence between the network address information of the second routing device and a network type of a network of the second routing device, and the network type comprises a user datagram protocol (UDP) network or a generic routing encapsulation (GRE) network.

5. The method according to claim 4, wherein the forwarding the second packet comprises:

forwarding, by the first routing device, the second packet to the second routing device according to the first correspondence using a forwarding tunnel that corresponds to the network type of the network of the second routing device, wherein the forwarding tunnel is determined according to the third correspondence.

6. The method according to claim 1, wherein the SF node is not connected to the first routing device.

7. An apparatus, comprising:

a non-transitory computer readable medium; and a processor that is connected to the non-transitory computer readable medium, wherein the non-transitory computer readable medium stores a program to be executed by the processor, the program including instructions to:

obtain a first packet sent by a second routing device, wherein the first packet carries a first correspondence, wherein the first correspondence comprises a correspondence between network address information of the second routing device and an identifier (ID) of a service function (SF) node;

store the first correspondence;

receive a second packet, wherein the second packet carries a service chain ID and an ID of a source SF node;

determine an ID of the SF node to process the second packet according to the service chain ID, further according to the ID of the source SF node and further according to a correspondence associated with the service chain ID, the ID of the source SF and the ID of the SF node; and forward the second packet to the second routing device according to the first correspondence.

8. The apparatus according to claim 7, wherein the program further include instructions to:

obtain a second correspondence, wherein the second correspondence is a correspondence between network address information of the apparatus for processing the packet and an ID of an SF node connected to the apparatus for processing the packet; and send a third packet to a third routing device connected to the apparatus for processing the packet, wherein the third packet carries the second correspondence.

9. The apparatus according to claim 8, wherein the program further include instructions to:

send a fourth packet to the third routing device connected to the apparatus for processing the packet, wherein the fourth packet carries the first correspondence, and the third routing device is different from the second routing device.

10. The apparatus according to claim 7, wherein the first packet carries a third correspondence, wherein the third correspondence comprises a correspondence between the network address information of the second routing device and a network type of a network of the second routing device, and wherein the network type comprises a user datagram protocol (UDP) network or a generic routing encapsulation (GRE) network.

11. The apparatus according to claim 10, wherein the program further include instructions to:

forward the second packet to the second routing device according to the first correspondence using a forwarding tunnel that corresponds to the network type of the network of the second routing device, wherein the forwarding tunnel that is corresponding to the network type of the network of the second routing device is determined according to the third correspondence.

12. The apparatus according to claim 7, wherein the SF node is not connected to the first routing device.

* * * * *